Figure 1:
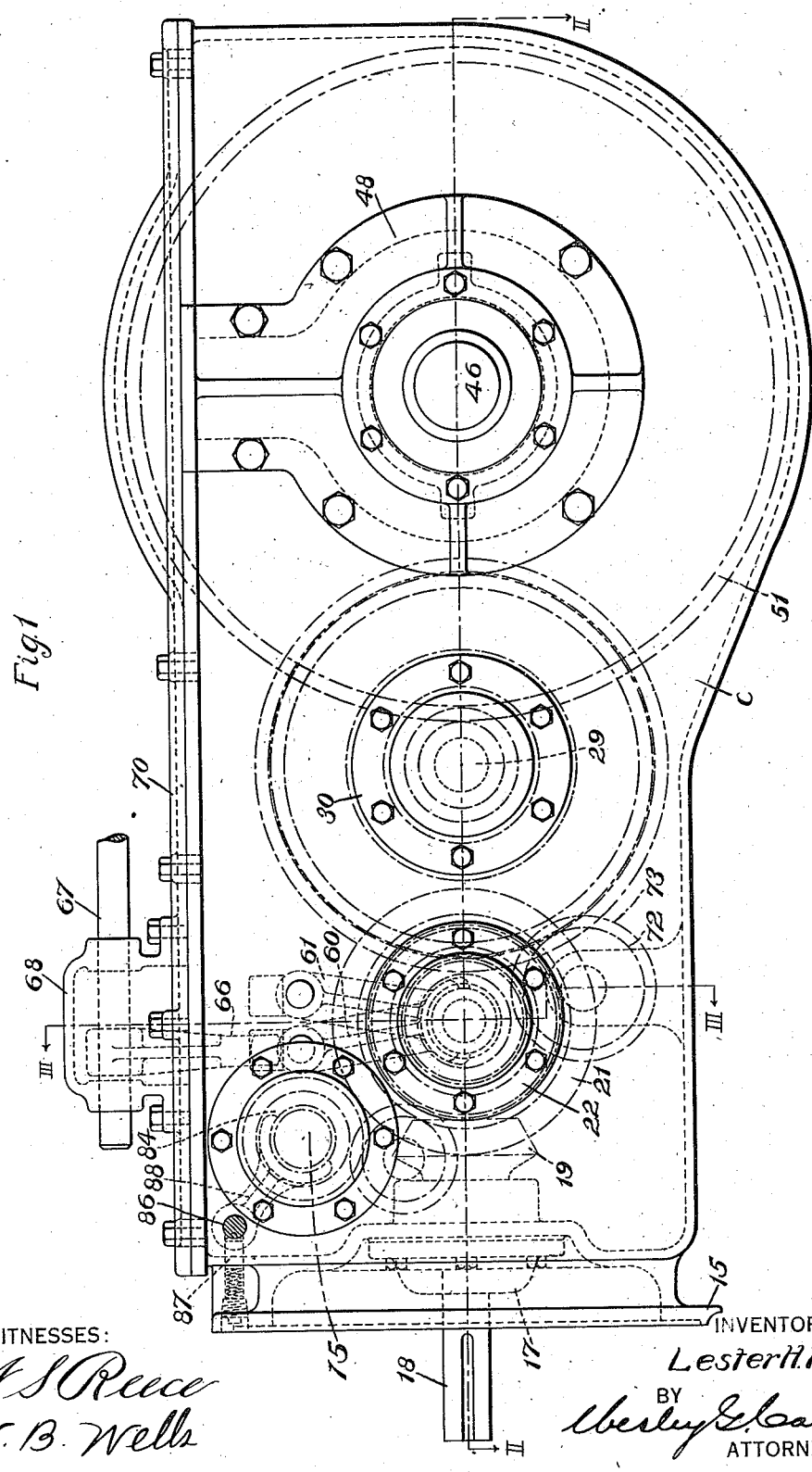

May 15, 1923.  
L. H. KEIM  
TRANSMISSION MECHANISM  
Filed Aug. 10, 1918

1,454,930

3 Sheets-Sheet 1

WITNESSES:  
W. S. Reece  
W. B. Wells

INVENTOR  
Lester H. Keim  
BY  
Wesley G. Carr  
ATTORNEY

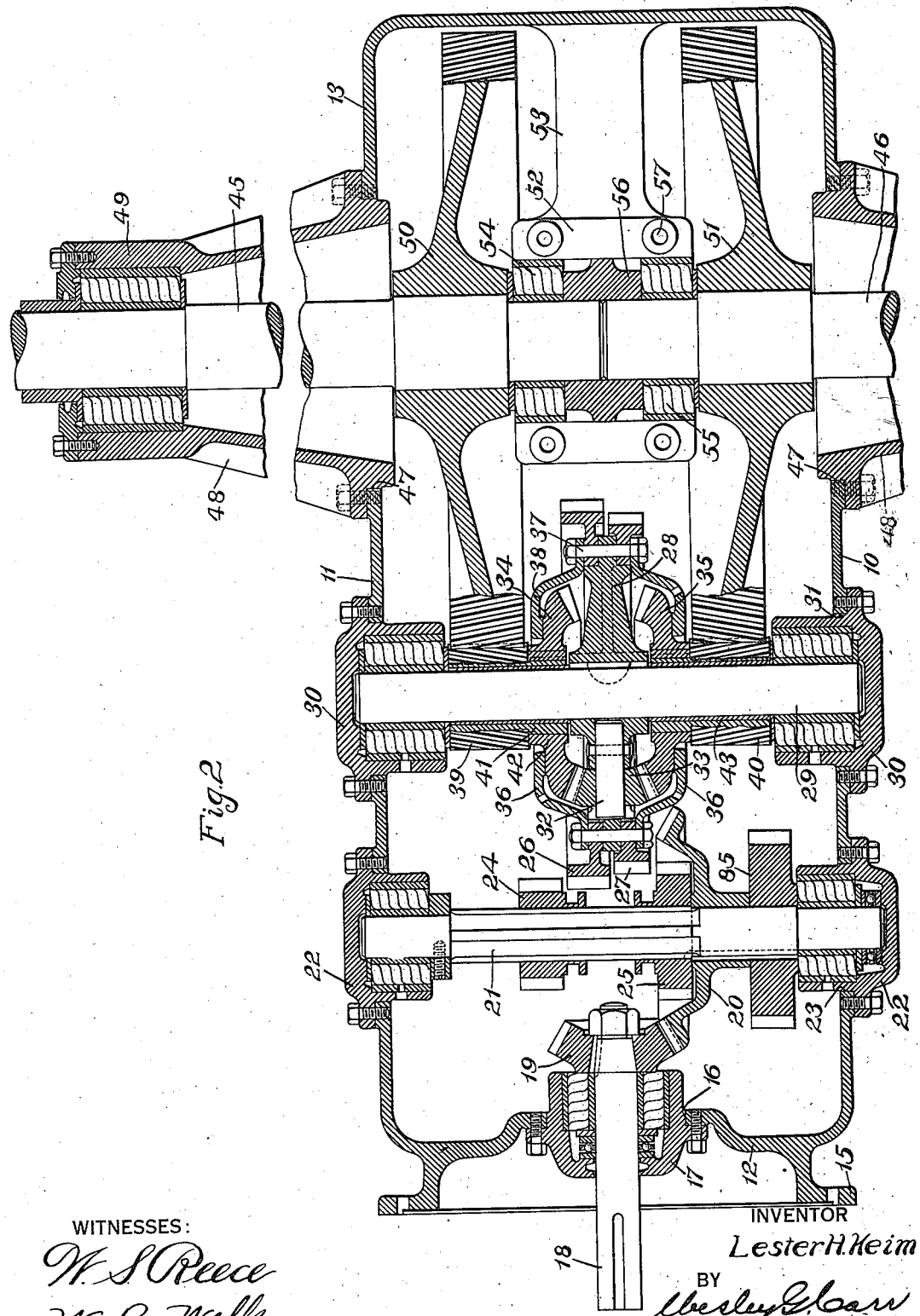

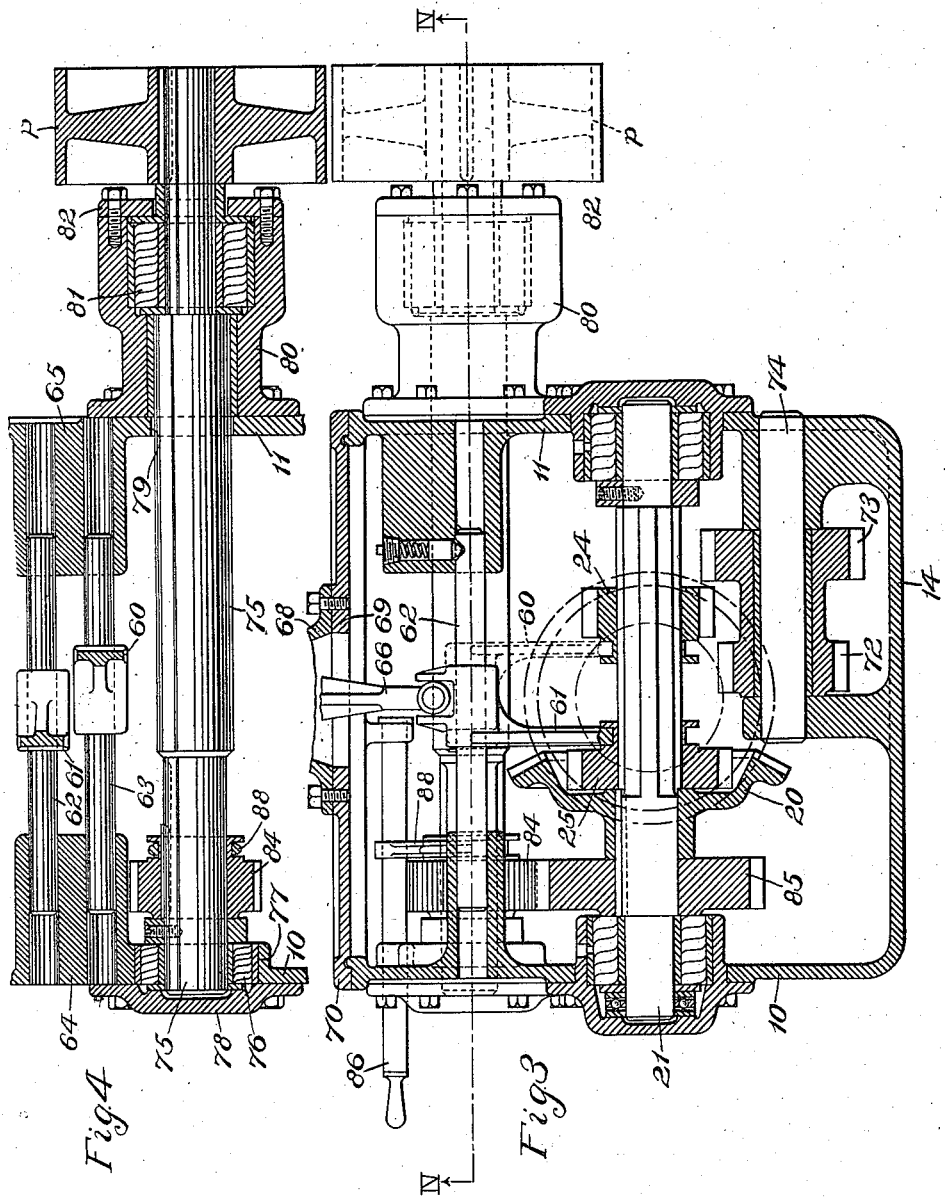

Patented May 15, 1923.

1,454,930

UNITED STATES PATENT OFFICE.

LESTER HOKE KEIM, OF CHICAGO, ILLINOIS, ASSIGNOR TO R. D. NUTTALL COMPANY, A CORPORATION OF PENNSYLVANIA.

TRANSMISSION MECHANISM.

Application filed August 10, 1918. Serial No. 249,318.

*To all whom it may concern:*

Be it known that I, LESTER H. KEIM, a citizen of the United States, and a resident of Chicago, in the county of Cook and State of Illinois, have invented a new and useful Improvement in Transmission Mechanisms, of which the following is a specification.

This invention relates to transmission mechanisms and particularly to simple and compact change-speed mechanisms for use on heavy-duty vehicles such as farm tractors, trucks and the like.

One of the objects of this invention is to provide a mechanism embodying a main encased power-transmission mechanism through which the tractor-propelling effort is transmitted, and an independent power or pulley shaft that extends into the transmission case and is adapted to be operatively disconnected from the main transmission mechanism so that the pulley may be kept from rotating while the tractor is being moved by its own power into position to tighten the belt connected to the farm machine driven from said pulley.

Another object of the invention is to arrange the pulley and its shaft as high as practicable above the ground so as to elevate the belt to prevent it from dragging on the ground.

Another object of this invention is to prevent buckling of the side walls of the gear case by mounting the inner ends of the driving axles in bearings carried by, and supported within, the gear case and between the driving gears.

Another object is to provide an improved differential mechanism and gearing connection to the driving axles.

The above and other objects and the novel features of the invention will be apparent from the following description, taken in connection with the drawings, in which Figure 1 is a side elevation of a transmission mechanism embodying my invention, parts within the gear case being shown in dotted lines; Fig. 2 is a horizontal sectional view of the mechanism taken on the line II—II of Fig. 1; Fig. 3 is a vertical transverse section of the mechanism taken on the line III—III of Fig. 1, looking in the direction of the arrows, and Fig. 4 is a horizontal sectional view of a part of the mechanism taken on the line IV—IV of Fig. 3, looking in the direction of the arrows.

The transmission mechanism illustrated is primarily adapted for use on a gas-engine-driven farm tractor, but it will be understood that the application of the invention is not limited to such motor vehicles but may be applied to other vehicles.

The transmission mechanism comprises a combined change-speed transmission and differential gear case C which is substantially rectangular in transverse section, embodying side walls 10 and 11, end walls 12 and 13 and a bottom wall 14. The front end wall 12 has a flange 15 which may be bolted to the clutch housing of an internal-combustion engine (not shown). The wall 12 has a central opening 16 covered by a removable cap 17 carrying a bearing for the propeller shaft 18 that extends into the front end of the casing, the opening 16 being of sufficient size to permit the insertion and removal therethrough of a bevel pinion 19 secured to the inner end of the propeller shaft.

The pinion 19 is constantly enmeshed with the bevel gear wheel 20 keyed to the driving or intermediate shaft 21, which is rotatably mounted, at its opposite ends, in bearings 22, in oppositely disposed openings 23 in the side wall of the gear case. The shaft 21 has a low-speed spur pinion 24 and a high-speed spur pinion 25 slidably mounted thereon, which pinions are adapted to mesh with the low-speed gear wheel 26 and the high-speed gear wheel 27, respectively. The gear wheels 26 and 27 are bolted to a differential spider 28 carried by an intermediate shaft 29 mounted in bearings in the caps 30 secured over oppositely disposed openings 31 in the side walls 10 and 11 of the gear case. Inwardly extending flanges on the caps 22 and 30 serve to provide substantial bearing supports within the gear case to carry the bearings for the shafts 21 and 29. The spider 28 also carries spindles 32, three in the present construction, which rotatably support bevel pinions 33 that mesh with differential bevel gear wheels 34 and 35 on opposite sides thereof. The axial movement of the gear wheels 34 and 35 is limited by differential side plates 36 which engage the outer face of the gear wheels 34 and 35 and are bolted to the spider 28 by the bolts 37 that also secure the gear wheels 26 and 27 to the spider. The side plates 36 have openings 38 therein to permit the circulation of oil through the differential mechanism.

Pinions 39 and 40, provided with helical gear teeth that face toward the center line of the gear case, are mounted on the shaft 29 on opposite sides of the differential mechanism. Each of the helical pinions has an integral hub portion 41 thereon extending inwardly and projecting into the space between the hub 42 of the adjacent bevel gear wheel and the shaft 29, being keyed or otherwise secured to the bevel gear wheel to rotate therewith. Bearing and distance sleeves 43 are disposed between the pinions 39 and 40 and the shaft 29.

The driving shafts or axles 45 and 46, which may be either geared to the road wheels or directly connected to the hubs thereof to provide a "live axle" drive, extend into the gear case C through oppositely disposed openings 47 in the side walls 10 and 11 and near the rear end of the case. The axles 45 and 46 are disposed parallel to the intermediate shafts 21 and 29 and transversely to the propeller shaft 18 and are surrounded by sleeves 48 secured to the side walls 10 and 11 over the openings 47 therein. The sleeves 48 carry bearings 49 within their outer ends for rotatably supporting the shafts 45 and 46, and are mounted upon the tractor or vehicle frame.

Helical gear wheels 50 and 51 are keyed to the shafts 45 and 46, respectively, at a slight distance from the inner ends of the shafts to leave sufficient space between the gear wheels for supporting the shafts at their inner ends. A bearing support 52 is cast integral with the gear case C in the bottom thereof near the rear wall 13 and joined to said wall by a web 53 which reinforces the bearing support 52 against driving thrusts. The bearing support 52 carries suitable bearings 54 and 55 for rotatably supporting the inner ends of the shafts 45 and 46, respectively, and a spacer 56 between the bearings 54 and 55. The ends of the shafts and the bearings are enclosed by a cover (not shown) secured to the bearing support 52 by bolts fitting in the bolt holes 57. The gear case is partly filled with lubricant and, therefore, sufficient lubricating material will circulate through the bearing surfaces on the support 52 to properly lubricate them.

Heretofore, the inner bearings for the shafts 45 and 46 have been mounted on the side walls 10 and 11 of the gear case but the severe strains on the shafts have caused the side walls of the case to buckle, and failures have resulted. By my improved construction, the strains are removed from the side walls of the case and are carried by the bottom, which is more rigid. Moreover, the shaft is amply supported on both sides of the driving gear so that the buckling tendency is practically eliminated.

By arranging the meshing gear wheels and pinions on opposite sides of the central plane of the case and positioning the differential mechanism so that it projects into the space between the gear wheels 50 and 51, I not only obtain a compact arrangement of transmission mechanism but also one that is symmetrical and less apt to be subjected to unequal strains. By using helical teeth on the pinions and gear wheels, I obtain the following important advantages over spur teeth: first, larger ratios of reduction may be obtained for a minimum size of gear; second, additional strength is obtained over the spur gear of the same size, and third, the mechanism has a higher efficiency and runs more quietly. Furthermore, by arranging the teeth so that they face in opposite directions, the axial thrusts of the shafts and against the side walls of the casing are neutralized.

The low and high-speed pinions 24 and 25 are slidable axially on the shaft 21 by the forked shifters 60 and 61 mounted in supports 64 and 65 in the inner side walls 10 and 11. The upper ends of the shifters 60 and 61 are provided with sockets to receive the lower end of a shifting arm 66 secured to the shifting rod 67 that is slidable and rockable in a cap 68 fitting over an opening 69 in the cover 70 of the gear case C. The rod 67 is connected to some device (not shown) that is accessible to the operator, who may thereby move the arm to change the speed of the vehicle. The reversing pinions 72 and 73 carried by the shaft 74, mounted in suitable bearings below the plane of the shafts 21 and 29, are connected together. The pinion 72 is constantly enmeshed with the gear 26 of the differential mechanism and, when it is desired to drive the vehicle in a reverse direction, the low-speed pinion 24 may be shifted into engagement with the pinion 73.

Heretofore, tractor-transmission mechanisms have been constructed in which the shaft 21 projects outside of the gear casing and carries a belt pulley so that the power plant of the tractor may be employed to drive farm machinery. Such a construction has certain objections, one of which is that, while the tractor is being used for ploughing and such work, the belt pulley is continually in operation and constitutes an additional moving part on the machine, and another objection is that, when the tractor is being moved into line with the stationary farm machine to which it is intended to be belted, the continually rotating pulley and its shaft interfere with the proper tensioning of the belt and the proper alinement of the machines. Usually, also, the pulley shaft is located so low that a long driving belt, between the pulley and the machine driven by it, is apt to drag and wear out the belt and otherwise interfere with the proper operation of the machinery. In order to provide a mechanism that will overcome the difficulties just mentioned, I provide an independent power or pulley shaft 75, one end of which is rotatably mounted in a bearing 76 carried in a cap 78 fitting in an opening 77 in the side wall 10 and bolted to the casing. The other end of the shaft extends through an opening 79 in the opposite side wall 11 and into a bearing support 80 bolted to the outer side of the casing and carrying bearings 81 that rotatably support the shaft 75. The shaft 75 passes through a cap 82 that covers the outer end of the bearing support 80 and the outer end of the shaft has a belt pulley P keyed thereto. The shaft 75 is located above the plane of the propeller shaft 18, intermediate shafts 21 and 29, and driving shafts 45 and 46 so as to mount the pulley thereon as high as practicable. Normally the shaft 75 and pulley P are stationary but the same may be operatively connected directly to the shaft 21 by a pinion 84 that is adapted to be moved into mesh with a gear wheel 85 keyed to the shaft 21 between the bevel gear wheel 20 and the adjacent end of the shaft 21. The pinion 84 is slidable axially on the shaft 75 by means of a shifter 88 that is secured to a shift rod 86 projecting outside of the gear case. The shift rod 86 is locked in either of its positions by means of a releasable spring latch 87 that engages a notch in the rod, and the rods 62 and 63 are provided with similar locking means. When the pinion 84 and the gear 85 are in mesh, the pulley will be driven from the propeller shaft 18 through the bevel gears 19 and 20, shaft 21, gears 85 and 84 and shaft 75, and, with the pinions 24 and 25 disengaged from the gears 26 and 27, the pulley will be driven while the vehicle is stationary. By moving the pinion 84 out of mesh with the gear wheel 85, the auxiliary power shaft 75 will be disengaged from the mechanism that transmits the power to the driving axles.

The operation of the mechanism will be apparent from the foregoing description and, while I have shown and described a preferred embodiment of my invention in detail, it is to be understood that various modifications may be made therein without departing from the spirit and scope of the invention as expressed in the appended claims.

I claim as my invention:

1. In a transmission mechanism, the combination of a gear case, a driving shaft extending into the front end of the gear case, driven shafts extending into said gear case at the rear end thereof and transversely of said propeller shaft, bearings for supporting the inner ends of said driven shafts, means in the gear case for transmitting power from said driving shaft to the driven shafts comprising an intermediate shaft, an independent power or pulley shaft mounted in bearings carried by said gear case, and means for operatively connecting and disconnecting said pulley shaft and said intermediate shaft.

2. In a transmission mechanism, the combination of a propeller shaft, driven shafts extending transversely to said propeller shaft, a bearing member for supporting the inner ends of said driven shafts, means for transmitting power from said propeller shaft to the driven shafts comprising an intermediate shaft extending transversely of said propeller shaft and geared thereto, an independent power or pulley shaft parallel with said intermediate shaft, and means for operatively connecting said pulley shaft and said intermediate shaft.

3. In a transmission mechanism, the combination of a gear case, a propeller shaft extending into the front end of the gear case, driven shafts extending transversely of the propeller shaft into the rear end of the case, means for transmitting power from said propeller shaft to the driven shafts comprising two intermediate shafts extending transversely of the propeller shaft and change-speed gearing and differential gearing, one of said intermediate shafts being directly geared to said propeller shaft, an independent power or pulley shaft carried by said case, and means for operatively connecting and disconnecting said pulley shaft and the intermediate shaft that is geared to the propeller shaft.

4. In a transmission mechanism, the combination of a transmission case, a propeller shaft and driven shafts extending into said case, means in said case for transmitting power from said propeller shaft to the driven shafts comprising a pair of intermediate shafts parallel to the driven shafts and transverse to the propeller shaft, slidable change-speed pinions on the first intermediate shaft, differential gearing on the second intermediate shaft, an intermediate power or pulley shaft carried by said case, and means for operatively connecting said pulley shaft and one of said intermediate shafts.

5. In a transmission mechanism, the combination of a driving shaft, driven shafts, and means for transmitting power from the driving shaft to the driven shafts comprising an intermediate shaft, symmetrically arranged gears on the driven shafts meshing with the pinions on the intermediate shaft, and a differential mechanism between the pinions on the intermediate shaft, said differential mechanism having bevel gear wheels, side plates limiting the axial movement of the bevel gear wheels, and said pinions having extended hubs projecting into and secured to the hubs of said bevel gear wheels.

In testimony whereof, I have hereunto subscribed my name this 22nd day of July, 1918.

LESTER HOKE KEIM.